United States Patent Office 3,598,821
Patented Aug. 10, 1971

3,598,821
METHOD OF PREPARING N-SUBSTITUTED 1,4,5,6-TETRAHYDRO - 6 - OXO-3-PYRIDAZINE CARBOXYLIC ACIDS
Arnold E. Young and John C. Little, Midland, Mich., assignors to The Dow Chemical Company, Midland, Mich.
No Drawing. Filed Dec. 23, 1968, Ser. No. 786,387
Int. Cl. C07d 51/04
U.S. Cl. 260—250  7 Claims

ABSTRACT OF THE DISCLOSURE

The present disclosure is directed to a process for the preparation of N-substituted 1,4,5,6-tetrahydro-6-oxo-3-pyridazine carboxylic acids. These acids are known in the art and are useful as intermediates in the preparation of N-substituted glutamines.

BACKGROUND OF THE INVENTION

N-substituted 1,4,5,6-tetrahydro-6-oxo-3-pyridazine carboxylic acids have been prepared by many procedures. One such procedure is taught in Kline et al., J. Org. Chem. 26, 1854 (1961) and U.S. Patent No. 2,873,294 wherein α-ketoglutaric acid is reacted with hydrazine.

While the above-described procedure is effective such a method is not entirely satisfactory from an economic standpoint.

The N-substituted 1,4,5,6-tetrahydro-6-oxo-3-pyridazine carboxylic acids are crystalline solids and are used as intermediates in the production of glutamines. The glutamines have utility as therapeutic agents in the treatment of peptic ulcers as taught in U.S. Patent 2,868,693 and to prevent the inhibiting effect of alcohols upon the growth of *Streptococcus faecalis*.

The conversion of N-substituted 1,4,5,6-tetrahydro-6-oxo-3-pyridazine carboxylic acids to the respective glutamines is taught by U.S. Patent 2,873,294.

OBJECT OF THE INVENTION

It is an object of the present invention to provide a new and improved process for the production of N-substituted 1,4,5,6-tetrahydro-6-oxo-3-pyridazine carboxylic acids. It is also a further object to provide a novel method which is more economical than known methods and which gives good yields of the N-substituted 1,4,5,6-tetrahydro-6-oxo-3-pyridazine carboxylic acids. Other objects and advantages will be apparent from the following specification and claims.

SUMMARY OF THE INVENTION

The present invention is directed to a process for the production of N-substituted 1,4,5,6-tetrahydro-6-oxo-3-pyridazine carboxylic acids corresponding to the formula

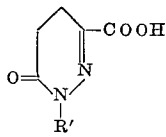

In this and succeeding formulae, R' represents an alkyl group of 1 to 10 carbon atoms, inclusive, phenyl, chlorophenyl, chlorophenyl methyl, alkyl substituted phenyl wherein the alkyl group contains 1 to 8 carbon atoms, inclusive, or hydrogen.

Representative alkyl groups include methyl, ethyl, propyl, isopropyl, n-butyl, secondary butyl, amyl, isoamyl, hexyl, heptyl, octyl, nonyl and decyl. Representative alkyl-substituted phenyl radicals include benzyl, xylyl, tolyl, butylphenyl and octylphenyl.

The process of the present invention comprises reacting in the presence of an alkali metal hydroxide a 2,2-dihaloglutaric acid compound of the formula

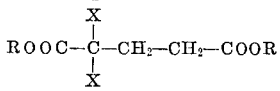

wherein X represents fluorine, chlorine or bromine and each R independently represents an alkyl group of 1 to 10 carbon atoms, inclusive, phenyl or hydrogen with a hydrazine compound of the formula

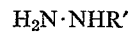

This reaction effects a conversion of the 2,2-dihaloglutaric acid compound, i.e. free acid or ester, to the corresponding N-substituted 1,4,5,6-tetrahydro-6-oxo-3-pyridazine carboxylic acid.

Representative 2,2-dihaloglutaric acid compounds are as follows:

2,2-dichloroglutaric acid,
dimethyl 2,2-dichloroglutarate,
methyl ethyl 2,2-dichloroglutarate,
2,2-dibromoglutaric acid,
dimethyl 2,2-dichloroglutarate,
dimethyl 2-chloro, 2-fluoroglutarate,
diethyl 2,2-dichloroglutarate,
dipropyl 2,2-dibromoglutarate,
di-n-butyl 2,2-dichloroglutarate,
diamyl 2,2-dichloroglutarate,
di-n-butyl 2,2-difluoroglutarate,
dihexyl 2,2-dibromoglutarate,
diheptyl 2,2-dibromoglutarate,
di-isopropyl 2,2-dichloroglutarate,
diphenyl 2-chloro, 2-bromoglutarate,
2,2-difluoroglutaric acid,
di-sec. butyl 2,2-dichloroglutarate,
dinonyl 2,2-dibromoglutarate,
didecyl 2,2-difluoroglutarate,
di-isoamyl 2,2-dichloroglutarate,
4-carboxymethyl 2,2-dichlorobutyric acid and
4-carboxydecyl 2,2-dichlorobutyric acid.

Representative substituted hydrazine compounds include: hydrazine, methyl hydrazine, ethyl hydrazine, propyl hydrazine, isopropyl hydrazine, n-butyl hydrazine, secondary butyl hydrazine, amyl hydrazine, isoamyl hydrazine, heptyl hydrazine, octyl hydrazine, nonyl hydrazine, decyl hydrazine, benzyl hydrazine, phenyl hydrazine, chlorophenyl hydrazine, tolyl hydrazine, xylyl hydrazine, butylphenyl hydrazine, octylphenyl hydrazine and chlorophenyl methyl hydrazine.

In one preferred embodiment for carrying out this reaction, a 2,2-dihaloglutaric acid compound, a hydrazine compound and an alkali metal hydroxide such as sodium hydroxide, potassium or lithium hydroxide are mixed together and reacted. For ease of reaction, the reactants are conveniently mixed with an inert solvent such as a mixture of water and methanol, ethanol, dioxane tetrahydrofuran or acetonitrile. The mixture is maintained under ambient atmospheric pressure and at a temperature in the range of between about 20° C. and about 150° C., ordinarily under total reflux, with the preferred temperature being the boiling point of the mixture. The mixture is reacted for a period of from about one to about four hours after which the solvent is removed by reduced pressure distillation. The residue remaining after stripping the solvent therefrom is dissolved in water and acidified with concentrated hydrochloric acid. The solid alkali metal chloride formed is removed by filtration, decantation or other conventional solid-liquid separatory procedures. The residual solution is cooled by refrigeration, or the like, to precipitate the desired product as a solid which is removed by filtration or other conventional solid-liquid separatory procedures. If desired, the product may be further purified by recrystallization from dilute hydrochloric acid.

In a second preferred embodiment, the reaction is carried out in two stages wherein a 2,2-dihaloglutaric acid compound is first contacted with one of the alkali metal hydroxides listed above and the resulting mixture dissolved in one of the above listed solvents. The mixture is refluxed, usually from about one to about four hours. Ordinarily, the reflux temperature is in the range of between about 20° C. and about 150° C. The mixture is cooled and the hydrazine compound added thereto in a second stage and this mixture is refluxed for an additional period, usually from about one to four hours. The solvent is removed and the product separated as previously described.

The amount of the reactants to be employed is not critical, some of the product being formed when employing any proportions. However, to insure the maximum product yield, the alkali metal hydroxide should be present in an amount equal to at least 2 moles of the hydroxide per mole of the acid compound reactant. The hydrazine compound should be present in at least an equimolar amount based on the amount of acid compound. The use of lower reactant molar ratios leads to poor yields of the product. The use of higher reactant ratios, in fact, are preferred since a slight excess, i.e. up to about 10 percent of stoichiometric of both the alkali metal hydroxide and the hydrazine compound serves to insure the completeness of the reaction. Additional quantities of reactants beyond this slight excess do not adversely affect the reaction, but may be undesirable from the standpoint of economy.

The pressure employed in carrying out the reaction of this invention is not critical and is limited only by economical and equipment considerations. From a practical standpoint, it is preferred to employ ambient atmospheric pressure.

The contact time of the reactants can be varied resulting in varying percentages of conversion of the 2,2-dihaloglutaric acid compound. The preferable contact time is from 1 to 4 hours for each of the refluxing steps.

DESCRIPTION OF SOME PREFERRED EMBODIMENTS

In order that the present invention may be more fully understood, the following examples are given primarily by way of illustration and should not be construed as limitations upon the overall scope of the present invention.

Example 1

Preparation of 1 - methyl-1,4,5,6-tetrahydro-6-oxo-3-pyridazine carboxylic acid.—To a solution consisting of 2.2 grams (0.055 mole) of sodium hydroxide and 1.3 grams (0.028 mole) of methyl hydrazine in 20 milliliters of a 1 to 1 volumetric mixture of water and methanol is added 5.7 grams (0.025 mole) of dimethyl 2,2-dichloroglutarate. A white precipitate immediately forms and redissolves upon the addition of 10 milliliters of water. The solution is maintained at reflux for 4 hours and the solvent is removed by reduced pressure distillation. The remaining residue is acidified with concentrated hydrochloric acid. Sodium chloride precipitates from the solution and is removed by filtration. The solution is cooled and the 1 - methyl-1,4,5,6-tetrahydro-6-oxo-3-pyridazine carboxylic acid precipitates as a white solid. The product is obtained in a yield of 2.0 grams (53 percent of theoretical) and has a melting point of 159–161° C. Identification was substantiated by comparison with a known sample of this compound.

Example 2

A solution of 5.7 grams (0.025 mole) of dimethyl 2,2-dichloroglutarate and 2.2 grams (0.055 mole) of sodium hydroxide in 30 milliliters of a 2 to 1 volumetric mixture of water and methanol is maintained under reflux conditions for 2 hours and allowed to cool. To this mixture is added 1.3 grams (0.028 mole) of methyl hydrazine and the mixture refluxed an additional 2 hours. The solvent is removed by reduced pressure distillation leaving a white solid as a residue. The solid is dissolved in 15 milliliters of water and refrigerated. Sodium chloride precipitates and is removed by filtration. The 1-methyl-1,4,5,6-tetrahydro-6-oxo-3-pyridazine carboxylic acid product precipitates upon further cooling and is recovered in a yield of 2.4 grams (60 percent of theoretical).

In a manner similar to that described for the foregoing examples and utilizing the novel process of the present invention, any one of the 2,2-dihaloglutaric acid compounds disclosed herein, can be reacted with any one of the disclosed hydrazine compounds to prepare the corresponding N-substituted 1,4,5,6 - tetrahydro-6-oxo-3-pyridazine carboxylic acid.

Representative preparations include:

N-ethyl-1,4,5,6-tetrahydro-6-oxo - 3 - pyridazine carboxylic acid (molecular weight 170) by the reaction of methyl ethyl 2,2-dichloroglutarate and ethyl hydrazine in ethanol.

N-n-butyl-1,4,5,6-tetrahydro-6-oxo-3 - pyridazine carboxylic acid (molecular weight 198) by the reaction of 2,2-dichloroglutaric acid and n-butyl hydrazine in methanol.

N-decyl-1,4,5,6-tetrahydro-6-oxo - 3 - pyridazine carboxylic acid (molecular weight 282) by the reaction of dimethyl-2-chloro, 3-fluoroglutarate and decyl hydrazine in methanol.

N - phenyl - 1,4,5,6 - tetrahydro - oxo - 3 - pyridazine carboxylic acid melting at 203–203.5° C. by the reaction of diheptyl 2,2-dibromoglutarate and phenyl hydrazine in methanol.

N-tolyl-1,4,5,6-tetrahydro-6-oxo - 3 - pyridazine carboxylic acid (molecular weight 232) by the reaction of diheptyl 2,2-dibromoglutarate and tolyl hydrazine in methanol.

N - octylphenyl - 1,4,5,6 - tetrahydro - 6 - oxo - 3 - pyridazine carboxylic acid (molecular weight 330) by the reaction of didecyl 2,2-difluoroglutarate and octylphenyl hydrazine in ethanol.

N - benzyl - 1,4,5,6 - tetrahydro - 6 - oxo - 3 - pyridazine carboxylic acid metling at 175°–177.5° C. by the reaction of di-n-butyl 2,2-difluoroglutarate and benzyl hydrazine in ethanol.

N-chlorophenyl-1,4,5,6-tetrahydro-6-oxo-3 - pyridazine carboxylic acid (molecular weight 252) by the reaction of 2,2-difluoroglutaric acid and chlorophenyl hydrazine in methanol.

N - ethyl - 1,4,5,6 - tetrahydro - 6 - oxo - 3 - pyridazine carboxylic acid (molecular weight 170) by the reaction of 4-carboxymethyl 2,2-dichlorobutyric acid

(HOOCCl$_2$CH$_2$CH$_2$COOCH$_3$)

and ethyl hydrazine in ethanol.

N-phenyl-1,4,5,6-tetrahydro-6-oxo-3 - pyridazine carboxylic acid melting at 203°–203.5° C. by the reaction of 4-carboxydecyl 2,2-dichlorobutyric acid

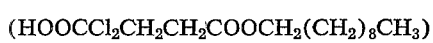

(HOOCCl$_2$CH$_2$CH$_2$COOCH$_2$(CH$_2$)$_8$CH$_3$)

and phenyl hydrazine in ethanol.

Preparation of starting materials.—The 2,2-dihaloglutaric acid and its esters employed as starting materials in the present invention are prepared by the method taught in German Patent 1,134,365 wherein a dihaloacetic acid is reacted with an α,β-olefinically unsaturated carboxylic acid in the presence of an inert solvent such as toluene or tertiary butanol at temperatures below 50° C. When an ester is the desired product of reaction, the appropriate esters of the above acids are reacted under the same conditions.

The substituted hydrazines employed as starting materials are commercial products and can be prepared by the methods taught in Wagner et al., Synthetic Organic Chemistry (1953), pages 733–738; John Wiley & Sons, Inc., N.Y.C. In these methods substituted hydrazines containing alkyl substituents of $C_6$ and above are prepared by the reaction of anhydrous hydrazine and alkyl halides. Those having alkyl substituents below $C_6$ are prepared by the reaction of hydrazine and an alkyl sulfate. Mono-aryl hydrazines and substituted mono-aryl hydrazines are prepared by the reduction of the appropriate aryl diazonium salt with sodium sulfate. In other methods, the mono-alkylhydrazines are prepared by reaction of the appropriate mono-amine with hydroxylamine-O-sulfonic acid in the presence of alkali.

What is claimed is:

1. A process for the production of N-substituted 1,4,5,6-tetrahydro-6-oxo-3-pyridazine carboxylic acids corresponding to the formula

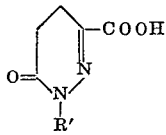

wherein R' represents an alkyl group of 1 to 10 carbon atoms, inclusive, phenyl, chlorophenyl, chlorophenylmethyl, alkyl substituted phenyl wherein the alkyl group contains 1 to 8 carbon atoms, inclusive, or hydrogen which comprises contacting a 2,2-dihaloglutaric acid compound of the formula

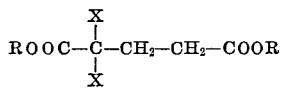

wherein each R independently represents an alkyl group of 1 to 10 carbon atoms, inclusive, phenyl or hydrogen and X represents fluorine, chlorine or bromine, a hydrazine compound of the formula $H_2NNHR'$ wherein R' is as defined above, and an alkali metal hydroxide, said hydrazine compound being present in at least an equimolar amount based on the amount of said acid and said alkali metal hydroxide being present in an amount of at least 2 moles per mole of said acid.

2. The process of claim 1 wherein the contacting is carried out at a temperature between about 20° C. and about 150° C.

3. The process of claim 1 wherein R' is an alkyl group of 1 to 10 carbon atoms, X is chlorine and R is an alkyl group of 1 to 10 carbon atoms.

4. The process of claim 1 wherein the 2,2-dihaloglutaric acid compound is dimethyl 2,2-dichloroglutarate, the hydrazine compound is methyl hydrazine and the product is 1-methyl-1,4,5,6-tetrahydro-6-oxo - 3 - pyridazine carboxylic acid.

5. The process of claim 4 wherein the contacting is carried out at a temperature between about 20° C. and about 150° C.

6. The process of claim 5 wherein the alkali metal hydroxide is sodium hydroxide.

7. The process of claim 1 wherein the 2,2-dihaloglutaric acid compound initially is contacted with the alkali metal hydroxide and the resulting mixture is subsequently contacted with the hydrazine compound.

References Cited
UNITED STATES PATENTS 2,873,294   2/1959   Kline _____ 260—250A

OTHER REFERENCES

Castleman et al.: Jour. Amer. Chem. Soc., vol. 67, pp. 60–62 (1945).

NICHOLAS S. RIZZO, Primary Examiner